US010730638B2

(12) United States Patent
Pogorelik et al.

(10) Patent No.: US 10,730,638 B2
(45) Date of Patent: Aug. 4, 2020

(54) ARRAYS OF DISTRIBUTED RECORDING DEVICES SUPPORTING BLACK BOX DATA RETENTION

(71) Applicant: Intel Corporation, Santa Clara, CA (US)

(72) Inventors: Oleg Pogorelik, Lapid (IL); Avi Priev, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 15/778,249

(22) PCT Filed: Dec. 24, 2015

(86) PCT No.: PCT/US2015/000509
§ 371 (c)(1),
(2) Date: May 23, 2018

(87) PCT Pub. No.: WO2017/111875
PCT Pub. Date: Jun. 29, 2017

(65) Prior Publication Data
US 2018/0346144 A1 Dec. 6, 2018

(51) Int. Cl.
*B64D 45/00* (2006.01)
*B61L 3/00* (2006.01)
(Continued)

(52) U.S. Cl.
CPC .......... *B64D 45/00* (2013.01); *B60R 16/0231* (2013.01); *B61L 3/002* (2013.01);
(Continued)

(58) Field of Classification Search
CPC ...... B64D 45/00; H04W 4/48; B60R 16/0231
See application file for complete search history.

(56) References Cited

U.S. PATENT DOCUMENTS 6,389,340 B1  5/2002 Rayner
6,898,492 B2  5/2005 de Leon et al.
(Continued)

FOREIGN PATENT DOCUMENTS

WO  2017111875  6/2017

OTHER PUBLICATIONS

International Searching Authority, "International Search Report and Written Opinion," issued in connection with International Patent Application No. PCT/US2015/000509, dated Sep. 23, 2016, 11 pages.

*Primary Examiner* — Michael D Lang
(74) *Attorney, Agent, or Firm* — Hanley, Flight & Zimmerman, LLC

(57) ABSTRACT

A system and method for providing arrays of distributed recording devices supporting black box data retention on transports are disclosed. A particular embodiment includes: a main black box data retention device on a transport for recording transport data including operational and status data of the transport while in operation, the main black box data retention device including a wireless data transmission device; and an array of distributed wireless recording devices on the transport and in wireless data communication with the main black box data retention device, each distributed wireless recording device of the array including: a power supply; a wireless data receiver; a non-volatile memory device; and a control unit to receive the transport data from the main black box data retention device via the wireless data receiver and to store the transport data into the non-volatile memory device.

20 Claims, 5 Drawing Sheets

(51) Int. Cl.
    *H04W 4/48*     (2018.01)
    *B60R 16/023*     (2006.01)
    *G07C 5/02*     (2006.01)
    *G07C 5/08*     (2006.01)
    *H04L 29/08*     (2006.01)

(52) U.S. Cl.
    CPC ............... *G07C 5/02* (2013.01); *G07C 5/085* (2013.01); *H04W 4/48* (2018.02); *B64D 2045/0065* (2013.01); *H04L 67/12* (2013.01)

(56) References Cited

U.S. PATENT DOCUMENTS

| | | |
|---|---|---|
| 2009/0112381 A1 | 4/2009 | Schwinn et al. |
| 2010/0250057 A1 | 9/2010 | Steffler |
| 2014/0277924 A1 | 9/2014 | van den Heuvel et al. |

```
                    Processing Logic for Arrays of Distributed Devices
                          Supporting Black Box Data Retention
                                         -1100-
```

Provide a distributed wireless recording device on a transport and in wireless data communication with a main black box data retention device, the distributed wireless recording device including: a power supply, a wireless data receiver, a temporary memory device, and a non-volatile memory device.
-1110-

Receive transport data from the main black box data retention device via the wireless data receiver on a periodic basis.
-1120-

Store the transport data into the temporary memory device.
-1130-

Determine if the distributed wireless recording device has lost data communication with the main black box data retention device.
-1140-

Transfer the transport data from the temporary memory device to the non-volatile memory device if data communication with the main black box data retention device is lost.
-1150-

Fig. 4    End

ARRAYS OF DISTRIBUTED RECORDING DEVICES SUPPORTING BLACK BOX DATA RETENTION

TECHNICAL FIELD

This patent application relates to electronic systems, mobile devices, Internet of Things (IoT) devices, data recording systems, and computer-implemented software, according to various example embodiments, and more specifically to a system and method for providing arrays of distributed recording devices supporting black box data retention on transports.

BACKGROUND

According to international rules, commercial aircraft shall be provided with a unit generally known as a black box (although they are usually painted with a bright orange color) having means for recording data regarding the aircraft for investigation purposes. Black boxes can record aircraft performance parameters, conversations between the flight crew, and in certain cases images taken by cameras. Black boxes store only the information corresponding to a predetermined last period of the flight, typically 30 minutes. Black boxes are designed to be crash survivable and easy to locate; so, they are designed with a rugged construction to withstand severe impacts. Additionally, black boxes usually have automatic beacons, which begin transmitting a signal after a crash to enhance their recoverability. Black boxes are usually installed in the aft portion of the aircraft, which provides a level of protection for a typical crash. While black boxes can usually be recovered in crash events on land, the same does not apply to crash events at sea or in rugged terrain. Accidents at sea present the problem of locating the crashed aircraft and recovering the black box in deep waters.

In order to facilitate the recovery of black boxes, it has been proposed, for example, to eject the black box prior to an aircraft crash to avoid the difficulties in the recovery of the black box. Other proposals would provide the black box with specific means for enabling its recovery such as, a floating means for crash events on the sea. However, these proposals have not been widely implemented because they have certain drawbacks. For example, the proposal for the ejection of the black box prior to a crash using explosive ejection mechanisms raises security concerns. In the case of accidents, crimes, or other anomalies, it is critical to be able to obtain telemetry and operational information from the aircraft, train, ship, automobile, or other vehicle involved in the incident. This information facilitates the rescue of survivors and the understanding of the causes of an accident. Unfortunately in many cases, the black box recorder, onboard computer, and other logging electronic devices are lost in fire, water, or just cannot be found. The inability to locate the black box greatly hinders the response to tragic events.

BRIEF DESCRIPTION OF THE DRAWINGS

The various embodiments are illustrated by way of example, and not by way of limitation, in the figures of the accompanying drawings in which:

FIG. 4 is a processing flow chart illustrating an example embodiment of a method as described herein.

DETAILED DESCRIPTION

Figure 1:
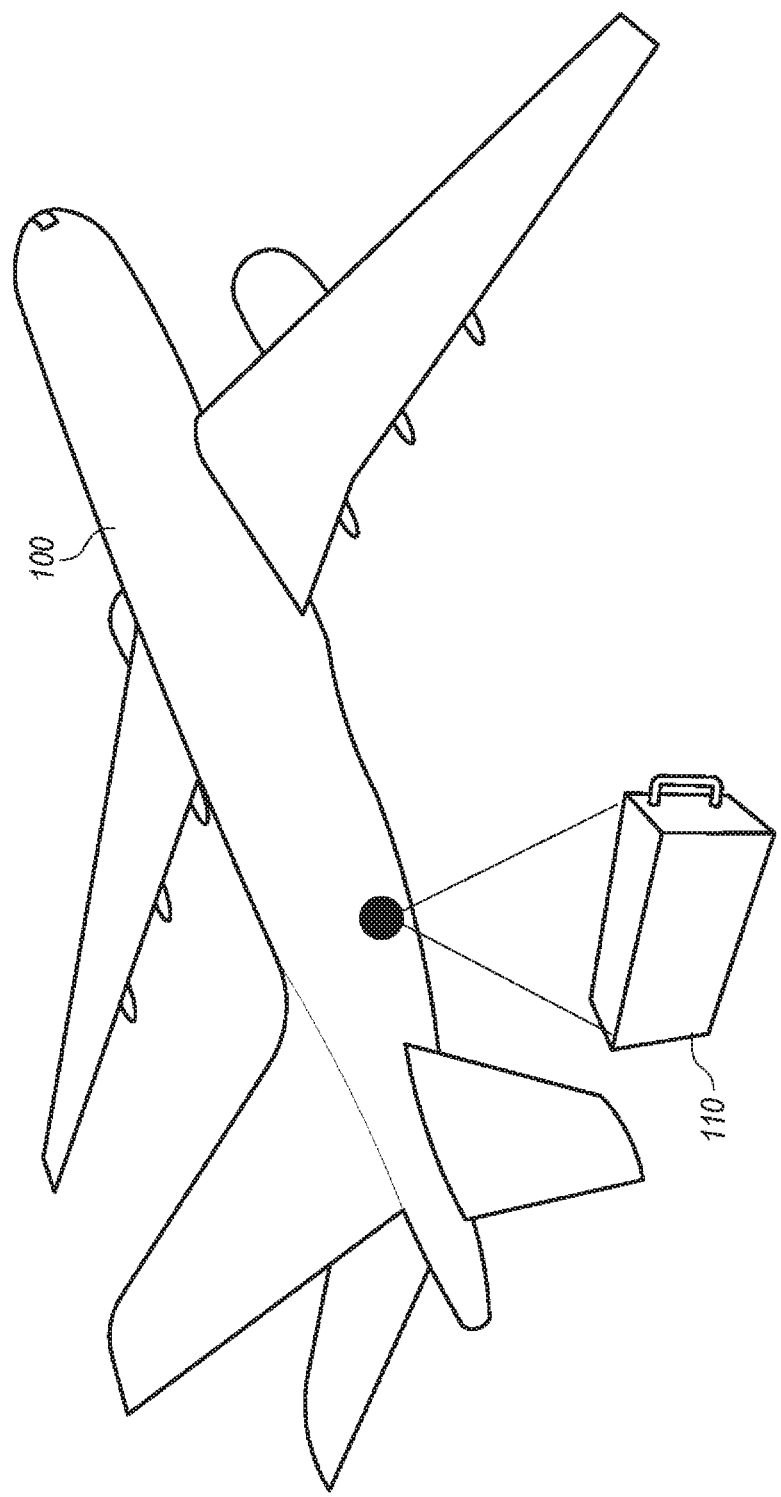
FIG. 1 is an example of a conventional transport (e.g., aircraft) shown to include a standard main black box data retention device.

In the following description, for purposes of explanation, numerous specific details are set forth in order to provide a thorough understanding of the various embodiments. It will be evident, however, to one of ordinary skill in the art that the various embodiments may be practiced without these specific details.

In the various embodiments described herein, a system and method for providing arrays of distributed recording devices supporting black box data retention on transports are disclosed. Various embodiments can use wireless data connectivity, wired data connectivity, optical connectivity, or any other means for transferring data between electronic devices. Example embodiments are described wherein low cost Internet of Things (IoT) type devices are used to significantly improve survivability and ease of recovery of the crucial information recorded before a crash or other incident involving aircraft, trains, ships, trucks, automobiles, or other vehicles (generally denoted herein as transports). The various embodiments open the doors for expanded use of black box recorders in the automotive and trucking industries. In addition to use in the aviation industry, the various embodiments also have application in the rail, shipping, ocean transportation, and construction industries, to name a few.

As described herein for example embodiments, an array of small and low cost Distributed Wireless Recording Devices (DWRDs) are embedded in or attached to the elements or components of a transport during construction or maintenance. Each DWRD is configured to be in wireless data communication with a main black box data retention device installed on the transport. The main black box data retention device can be similar to the conventional black box data retention devices installed on aircraft, for example. During normal operation, the main black box generates or obtains real time transport performance parameters, operational data, navigational data, global positioning system (GPS) data, environmental data, telemetry data, audio and/or video recording data, sensor data, transport identification or registration data, traffic data, velocity, altitude, and a variety of information useful for forensic or research analysis of a transport incident (denoted generally herein as the recorded transport data). The recorded transport data is retained or recorded in a memory device in the main black box. In an example embodiment, each DWRD on the transport can wirelessly communicate with the main black box and replicate important parts (or all) of the recorded transport data in a non-volatile memory device in each DWRD. Given the replication and distribution of some or all of the recorded transport data to a plurality of DWRDs on the transport, it will be more likely that the recorded transport data can be retrieved in the event of a crash or other catastrophic event. Because the array of DWRDs are distributed across many elements of the transport, retrieval of any portion of the transport can produce useful information, even if the main black box itself cannot be recovered. Moreover, retrieval of even a single DWRD can provide information to facilitate the retrieval of the main black box and other portions of a disintegrated transport. As a result, the use of an array of DWRDs can greatly improve the likelihood that recorded transport data can be retrieved, thus providing vital information for a better understanding of the reasons for the crash and facilitating the retrieval of the main black box data retention device. The details of various example embodiments are provided below in connection with the accompanying figures.

Turning now to FIG. 1, an example of a conventional transport (e.g., aircraft) 100 is shown to include a standard main black box data retention device 110. As well known to those of ordinary skill in the art, the main black box data retention device 110 can include one or more memory devices to record and retain various types of recorded transport data related to the operation and status of the transport 100. The main black box data retention device 110 can include a flight data recorder (FDR) that preserves the recent history of the flight through the recording of dozens of parameters collected several times per second. The main black box data retention device 110 can also include a cockpit voice recorder (CVR) that preserves the recent history of the sounds in the cockpit including the conversations of the flight crew. The recorded transport data retained by these devices can be digitized and stored as data in a conventional non-volatile memory device in the main black box data retention device 110. In a typical configuration, the main black box data retention device 110 is stored in the aft portion of the aircraft or in some location in the transport that is the least likely to be damaged or lost in the event of a crash or other catastrophic event. Nevertheless, recent events have shown that it can be very difficult to locate the main black box if the transport crashes, particularly in water or rugged terrain. As a result, the data needed to locate the downed transport and the information useful for understanding the cause of the crash is lost with the main black box.

Figure 2:
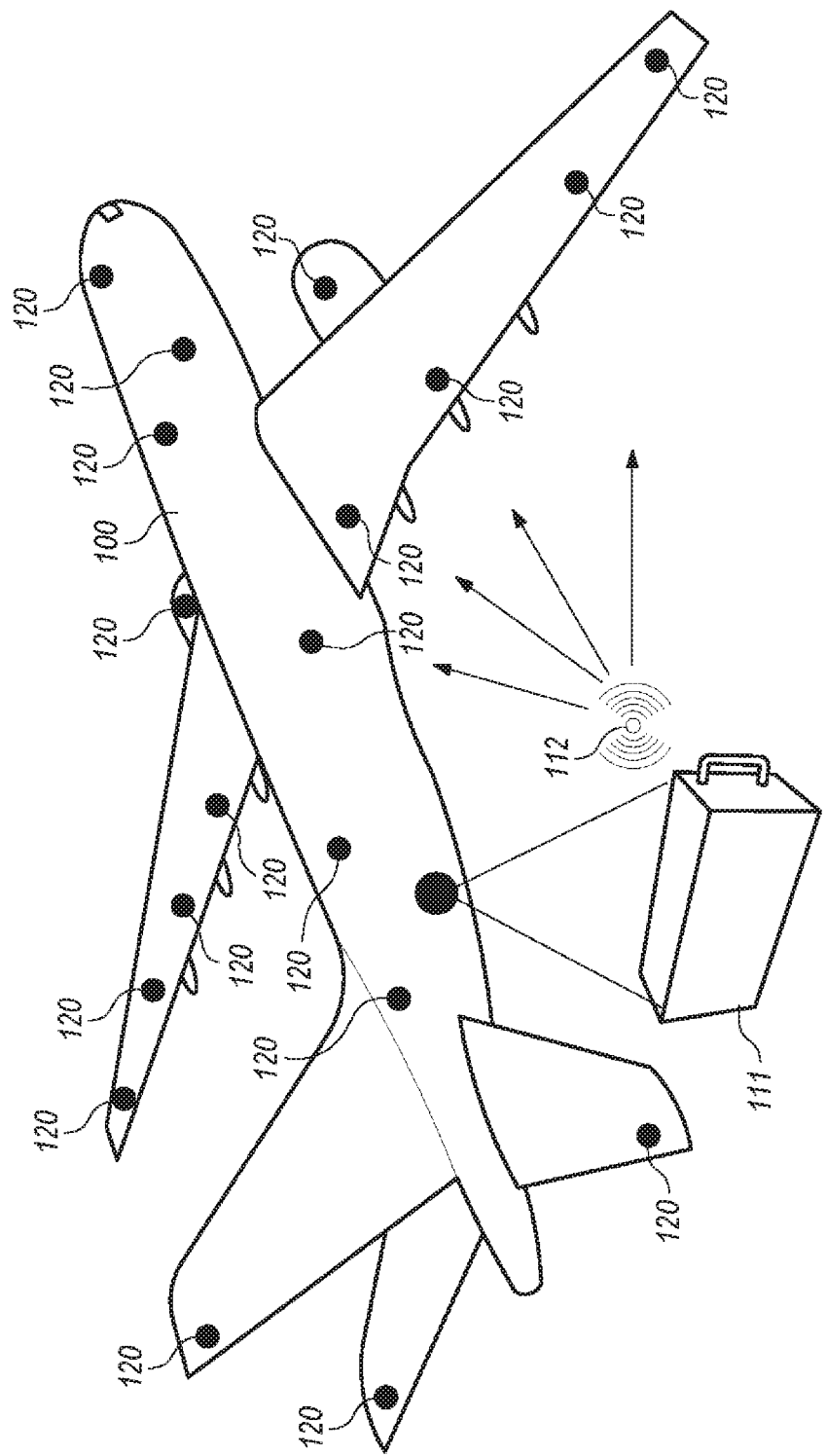
FIG. 2 is an example embodiment of an array of Distributed Wireless Recording Devices (DWRDs) supporting black box data retention on a transport.

Referring now to FIG. 2, the diagram illustrates an example embodiment of an array of distributed wireless data recording devices (DWRDs) 120 supporting black box data retention on a transport 100. As shown in FIG. 2, the array of DWRDs 120 can be integrated into or attached to the transport (e.g., the airframe of an aircraft) 100. The internal components of each of the DWRDs 120 is described in more detail below. The array of DWRDs 120 can be distributed and spread throughout the components of the transport 100, so all major components of transport 100 include at least one DWRD 120. Given the low cost of each DWRD 120, the array of DWRDs 120 can also be distributed and spread throughout the sub-components of the transport 100 and/or attached at multiple locations on each of the transport 100 components. The array of DWRDs 120 can be integrated or attached at internal or external locations on the transport 100. Each DWRD 120 can be attached to the transport 100 using any of a variety of attachment means including epoxy, rivets, screws, welds, or the like. The DWRD 120 can also be integrated into the structure or materials of the transport 100 during manufacture of the transport 100. The placement and distribution of the array of DWRDs 120 throughout the transport 100 is designed to maximize the likelihood that at least one DWRD 120 could be located if the transport 100 should disintegrate in an accident or incident.

In the example embodiment shown in FIG. 2, the main black box data retention device 111 is configured or modified to include a short range wireless data transmitter 112 and control logic to manage the communication of data between the main black box device 111 and each of the DWRDs 120 in the array of DWRDs. The control logic in main black box device 111 can be configured to, on a periodic basis, gather a portion (or all) of the recorded transport data that is normally retained in the memory device in the main black box device 111. The time period or frequency at which the data is gathered can be a configurable parameter that can be set depending on the quantity of data being gathered, the rate at which the data changes, and the power constraints of the DWRDs 120. This gathered set of recorded transport data can be broadcast to the array of DWRDs 120 using the wireless data transmitter 112 in the modified main black box device 111. Wireless radio receivers in each of the DWRDs 120 can receive this periodic broadcast of the recorded transport data. The received recorded transport data can be stored in a temporary memory device and/or a non-volatile memory device in each of the DWRDs 120. The data stored in each of the DWRDs 120 can also be augmented with additional stored data, such as an identifier of the transport and/or an identifier of the main black box device 111, an identifier of the particular DWRD 120, a part number, component identifier, or location of the transport component on which the particular DWRD 120 was installed/attached, and any other information that could be useful for the reconstruction and retrieval of the transport after an incident.

In a particular embodiment, each of the DWRDs 120 in the array of DWRDs can be configured as a node in wireless data communication in a mesh network configuration. Mesh networking is a way to route data and instructions between nodes in an array. Mesh networking allows for continuous connections and reconfiguration around broken or blocked paths by "hopping" from node to node until a destination in the array is reached. Mesh networks differ from other networks in that the component parts (nodes) can all connect to each other via multiple hops. In the particular embodiment, the mesh network configuration of the DWRDs 120 enables a two-way data communication between the main black box device 111 and the array of DWRDs 120. The mesh network configuration of the DWRDs 120 also enables a two-way data communication between each of the DWRDs 120 themselves. This configuration allows any of the DWRDs 120 to report status or other information back to the main black box device 111 or to any of the other DWRDs 120 in the array.

Figure 3:
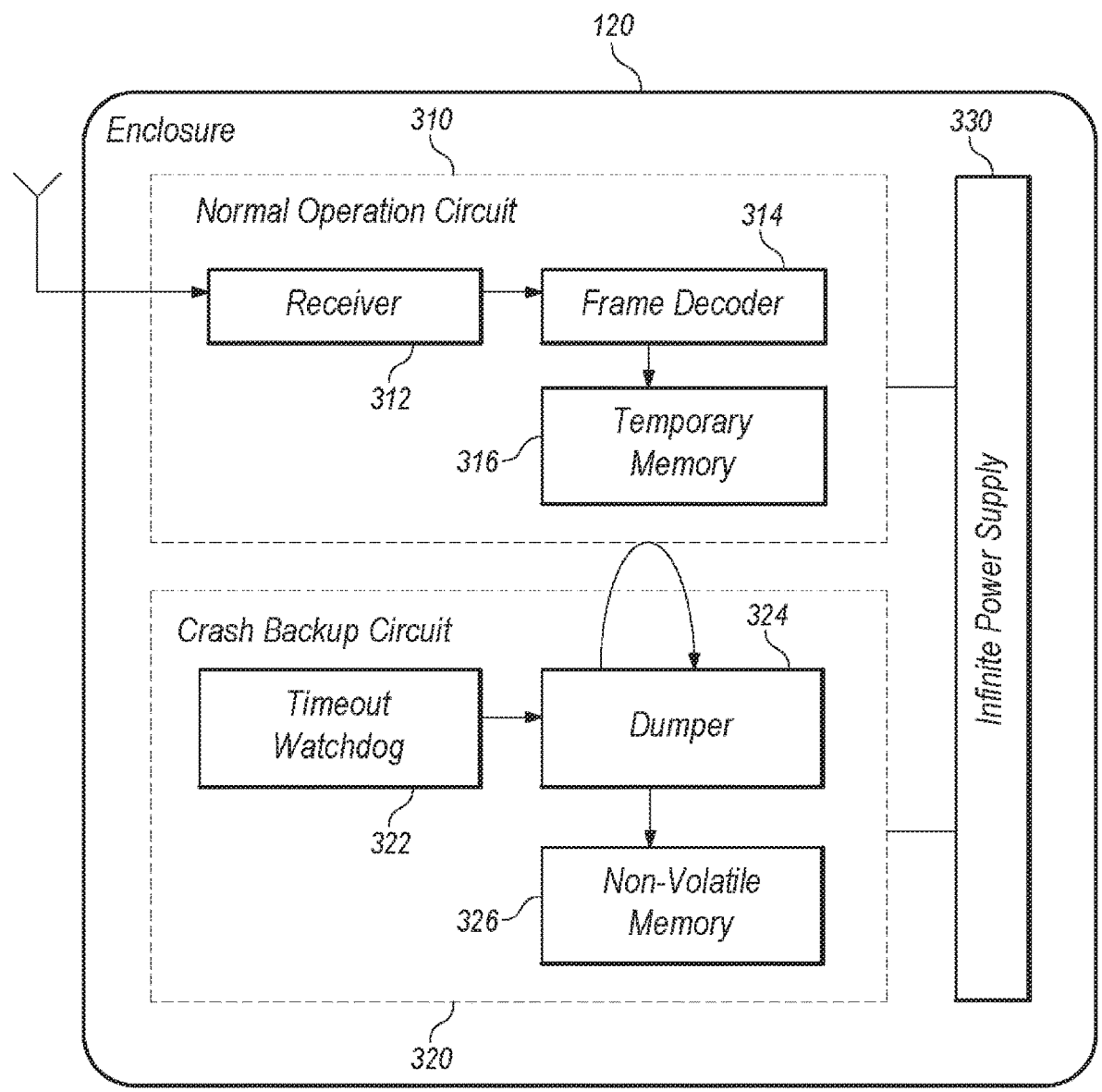
FIG. 3 is an example embodiment showing the internal components of each of the Distributed Wireless Recording Devices (DWRDs) of a DWRD array in the example embodiment.

Referring now to FIG. 3, an example embodiment illustrates the internal components of each of the DWRDs 120 of the DWRD array. As shown, the DWRD 120 of an example embodiment can include a normal operation circuit 310, a crash backup circuit 320, and a power supply 330 all encased in an enclosure. The enclosure can be a water and fire resistant and shock proof rigid covering. The enclosure can also include a mounting bracket for mounting the DWRD 120 to a surface of the transport 100. The power supply 330 can be a standard autonomous power element, power storage element (e.g., a battery, capacitor, etc.), or a power generation element, such as a solar cell, a vibration power generator, heat converter, or the like. The DWRD 120 can be configured to draw very little electrical power during normal operation. As such, the power storage element or power generation element 330 does not need to store or generate much electrical power and therefore does not need to be a large or expensive device. The power supply 330 can be configured to provide a sufficient service life suitable for the particular application in which the DWRD 120 is being used.

The normal operation circuit 310 can include a wireless radio data receiver 312 coupled to an antenna, a processing/control unit and frame decoder 314, and a temporary memory device 316. As described above, the main black box device 111 can gather a set of recorded transport data and broadcast the data to the array of DWRDs 120 using the wireless data transmitter 112 in the modified main black box device 111. In an alternative embodiment, the wireless data transmitter 112 can be a wireless data transceiver. Wireless radio receivers 312 in each of the DWRDs 120 can receive this periodic broadcast of the recorded transport data. In an alternative embodiment, the wireless radio receivers 312 can be wireless data transceivers. The received recorded transport data can be stored in a temporary memory device 316 in each of the DWRDs 120. In a particular example embodiment, the wireless radio receivers 312 in each of the DWRDs 120 can be configured to periodically wake up (e.g., become active or transition out of an inactive or power-conserving state) and listen for the data broadcast from the main black box device 111. The time period or frequency at which each of the DWRDs 120 awaken and listen for the broadcast can be a configurable parameter that can be set depending on the quantity of data being gathered, the rate at which the data changes, and the power constraints of the DWRDs 120. When the wireless radio receiver 312 in a DWRD 120 receives a data broadcast, the received data can be passed to the processing/control unit and frame decoder 314 of the DWRD 120.

In the example embodiment, the recorded transport data can be broadcast in data frames or segments. A particular frame may correspond to a particular type of data, such as telemetry. In other embodiments, the data frames or segments are merely data blocks of a length or size compatible with the hardware or communication protocol used in a particular application. The processing/control unit and frame decoder 314 can receive a data frame from the wireless radio receiver 312 and store each received frame in the temporary memory 316. The temporary memory 316 can be implemented as a standard random access memory (RAM) device that consumes a minimal level of electrical power. Other embodiments can use other forms of low-power, volatile or non-volatile data storage devices. The data can be stored in contiguous locations in the memory 316 until the storage limit or capacity of the memory 316 is reached. At that point, the next newest data frame received in a broadcast can be stored in a location of memory 316 corresponding to the oldest previously stored data frame. In this manner, the content of memory 316 always represents the most current set of data frames broadcast from the main black box device 111, given the capacity of memory 316. During normal operation of the transport 100 and the DWRDs 120 thereon, each of the DWRDs 120 in the DWRD array will continually receive and store updates to the recorded transport data. As long each DWRD 120 continues to receive the data broadcast from the main black box device 111 on a periodic basis, the DWRD 120 can continue to function in a normal operation mode and continue to store updated transport data using the normal operation circuit 310, as shown in FIG. 3.

Once a DWRD 120 fails to receive the data broadcast from the main black box device 111 at an expected time or interval, the DWRD 120 can transition to a crash operation mode implemented by the crash backup circuit 320 shown in FIG. 3. In an example embodiment, the crash backup circuit 320 can include a watchdog timer 322, a memory dumper 324, and a non-volatile memory 326. The watchdog timer 322 can be used to monitor the periodic update of the transport data in the temporary memory 316. Each time the data broadcast is received by a DWRD 120 and the transport data is stored in memory 316, the watchdog timer 322 can be reset. As long the DWRD 120 continues to receive the data broadcast from the main black box device 111 on a periodic basis, the watchdog timer 322 will not timeout. Although the DWRD 120 can lose wireless data communication with the main black box device 111 for any number of reasons, the DWRD 120 can assume that a crash or other catastrophic event has occurred to transport 100, if the DWRD 120 loses data communication with the main black box device 111. In this case, watchdog timer 322 will timeout and the crash backup circuit 320 will trigger the memory dumper 324 to transfer all of the current content of the temporary memory 316 to the non-volatile memory 326. As a result, the most recent set of recorded transport data will be retained in the non-volatile memory 326 of the DWRD 120. In a crash scenario when the main black box device 111 separates from the transport 100, for example, all DWRDs 120 in the DWRD array will lose wireless data communication with the main black box device 111 and all DWRDs 120 in the DWRD array will immediately transfer their latest recorded transport data to their non-volatile memory devices 326. In this manner, each of the DWRDs 120 in the array will contain a copy of the most recently recorded transport data. Therefore, if any piece of wreckage of the transport 100 is found to contain a DWRD 120, the portion of the wreckage and the DWRD 120 thereon can be used to deconstruct the crash or the incident using the recorded transport data from the non-volatile memory 326 of the DWRD 120. This information can also be used to locate the main black box device 111 itself. Thus, the various embodiments enable the most recently recorded transport data to be retained and distributed across the entirety of the transport, thereby maximizing the likelihood that the important transport data can be retrieved in the event of a catastrophic event. The various embodiments described herein also allow the detection and recovery of the vital transport data even when the main black box device 111 is destroyed or cannot be found. The various embodiments described herein provide a highly reliable and survivable system with a relatively low cost array of DWRDs and without the need to change existing infrastructure. The various embodiments, therefore, can save lives, effort, money, and improve the chances for solving mysteries that would otherwise be unresolved.

In an alternative embodiment, the crash backup circuit 320 can be eliminated and the recorded transport data can be periodically stored directly into a non-volatile memory device. If the power requirements of a particular type of non-volatile memory are low enough and/or the power retained or generated by the power supply 330 is high enough, it may not be necessary to temporarily store the transport data in a low power RAM memory.

In another alternative embodiment, it may be advantageous for each DWRD 120 to store a different portion of the data from the main black box device 111. This could be due to the fact that there is too much flight data or that each individual DWRD 120 does not have enough memory to store the entire data set. For example, it may be advantageous for a group of DWRDs 120 on a portion of the transport (e.g., left wing, right wing, cockpit, etc.) to collectively store all the data from the main black box device 111, wherein each DWRD 120 of the group only stores a portion of the entire data set.

Referring now to FIG. 4, a processing flow diagram illustrates an example embodiment of a method 1100 as described herein. The method 1100 of an example embodiment includes: providing a distributed wireless recording device on a transport and in wireless data communication with a main black box data retention device, the distributed wireless recording device including: a power supply, a wireless data receiver, a temporary memory device, and a non-volatile memory device (processing block 1110); receiving transport data from the main black box data retention device via the wireless data receiver on a periodic basis (processing block 1120); storing the transport data into the temporary memory device (processing block 1130); determining if the distributed wireless recording device has lost data communication with the main black box data retention device (processing block 1140); and transferring the transport data from the temporary memory device to the non-volatile memory device if data communication with the main black box data retention device is lost (processing block 1150).

Embodiments described herein are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size can be manufactured. In addition, well-known power/ground connections to integrated circuit (IC) chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one of ordinary skill in the art. Where specific details (e.g., circuits) are set forth in order to describe example embodiments, it should be apparent to one of ordinary skill in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Each DWRD 120 may include one or more wireless transceivers, in some embodiments. Each of the wireless transceivers may be implemented as physical wireless adapters or virtual wireless adapters, sometimes referred to as "hardware radios" and "software radios," respectively. A single physical wireless adapter may be virtualized (e.g., using software) into multiple virtual wireless adapters. A physical wireless adapter typically connects to a hardware-based wireless access point. A virtual wireless adapter typically connects to a software-based wireless access point, sometimes referred to as a "SoftAP." For instance, a virtual wireless adapter may allow ad hoc communications between peer devices, such as any of the DWRDs 120 in the DWRD array. Various embodiments may use a single physical wireless adapter implemented as multiple virtual wireless adapters, multiple physical wireless adapters, multiple physical wireless adapters each implemented as multiple virtual wireless adapters, or some combination thereof. The example embodiments described herein are not limited in this respect.

The wireless transceivers may include or implement various communication techniques to allow the DWRDs 120 to communicate with other electronic devices, including the main black box device 111. For instance, the wireless transceivers may implement various types of standard communication elements designed to be interoperable with a network, such as one or more communications interfaces, network interfaces, network interface cards (NIC), radios, wireless transmitters/receivers (transceivers), wired and/or wireless communication media, physical connectors, and so forth.

By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other parts of the spectrum, and other wireless media.

In various embodiments, the DWRDs 120 may implement different types of wireless transceivers. Each of the wireless transceivers may implement or utilize a same or different set of communication parameters to communicate information between various electronic devices. In one embodiment, for example, each of the wireless transceivers may implement or utilize a different set of communication parameters to communicate information between the DWRDs 120 and the main black box device 111. Some examples of communication parameters may include without limitation a communication protocol, a communication standard, a radio-frequency (RF) band, a radio, a transmitter/receiver (transceiver), a radio processor, a baseband processor, a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for the wireless transceivers. The example embodiments described herein are not limited in this respect.

In various embodiments, the wireless transceivers may implement different communication parameters offering varying bandwidths, communications speeds, or transmission ranges. For instance, a first wireless transceiver may include a short-range interface implementing suitable communication parameters for shorter range communication of information, while a second wireless transceiver may include a long-range interface implementing suitable communication parameters for longer range communication of information.

In various embodiments, the terms "short-range" and "long-range" may be relative terms referring to associated communications ranges (or distances) for associated wireless transceivers as compared to each other rather than an objective standard. In one embodiment, for example, the term "short-range" may refer to a communications range or distance for a first wireless transceiver that is shorter than a communications range or distance for another wireless transceiver implemented for the DWRDs 120 or the main black box device 111. Similarly, the term "long-range" may refer to a communications range or distance for a second wireless transceiver that is longer than a communications range or distance for another wireless transceiver implemented for the DWRDs 120 or the main black box device 111. The example embodiments described herein are not limited in this respect.

In one embodiment, for example, the wireless transceiver may include a radio designed to communicate information over a wireless personal area network (WPAN) or a wireless local area network (WLAN). The wireless transceiver may be arranged to provide data communications functionality in accordance with different types of lower range wireless network systems or protocols. Examples of suitable WPAN systems offering lower range data communication services may include a Bluetooth™ system as defined by the Bluetooth Special Interest Group, an infra-red (IR) system, an Institute of Electrical and Electronics Engineers (IEEE™) 802.15 system, a DASH7 system, wireless universal serial bus (USB), wireless high-definition (HD), an ultra-side band (UWB) system, and similar systems. Examples of suitable WLAN systems offering lower range data communications services may include the IEEE 802.xx series of protocols, such as the IEEE 802.11a/b/g/n series of standard protocols and variants (also referred to as "WiFi"). It may be appreciated that other wireless techniques may be implemented. The example embodiments described herein are not limited in this respect.

In one embodiment, for example, the wireless transceiver may include a radio designed to communicate information over a wireless metropolitan area network (WMAN), a wireless wide area network (WWAN), or a cellular radio-telephone system. Another wireless transceiver may be arranged to provide data communications functionality in accordance with different types of longer range wireless network systems or protocols. Examples of suitable wireless network systems offering longer range data communication services may include the IEEE 802.xx series of protocols, such as the IEEE 802.11a/b/g/n series of standard protocols and variants, the IEEE 802.16 series of standard protocols and variants, the IEEE 802.20 series of standard protocols and variants (also referred to as "Mobile Broadband Wireless Access"), and so forth.

Alternatively, the wireless transceiver may include a radio designed to communicate information across data networking links provided by one or more cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and similar systems. It may be appreciated that other wireless techniques may be implemented. The example embodiments described herein are not limited in this respect.

Although not shown, the DWRDs 120 or the main black box device 111 may further include one or more device resources commonly implemented for electronic devices, such as various computing and communications platform hardware and software components typically implemented by an electronic device. Some examples of device resources may include without limitation a co-processor, a graphics processing unit (CPU), a chipset/platform control logic, an input/output (I/O) device, computer-readable media, network interfaces, portable power supplies (e.g., a battery), application programs, system programs, and so forth. The example embodiments described herein are not limited in this respect.

Included herein is a set of logic flows representative of example methodologies for performing novel aspects of the disclosed architecture. While, for purposes of simplicity of explanation, the one or more methodologies shown herein are shown and described as a series of acts, those of ordinary skill in the art will understand and appreciate that the methodologies are not limited by the order of acts. Some acts may, in accordance therewith, occur in a different order and/or concurrently with other acts from those shown and described herein. For example, those of ordinary skill in the art will understand and appreciate that a methodology can alternatively be represented as a series of interrelated states or events, such as in a state diagram. Moreover, not all acts illustrated in a methodology may be required for a novel implementation. A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The example embodiments disclosed herein are not limited in this respect.

The various elements of the example embodiments as previously described with reference to the figures may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The example embodiments described herein provide a technical solution to a technical problem. The various embodiments improve the functioning of the electronic device and a related system by enabling systems and methods for providing arrays of distributed recording devices supporting black box data retention on transports. The various embodiments also serve to transform the state of various system components based on a dynamically determined system context. Additionally, the various embodiments effect an improvement in a variety of technical fields including the fields of dynamic data processing, transport incident investigation, mobile computing, information sharing, and mobile communications.

Figure 5:
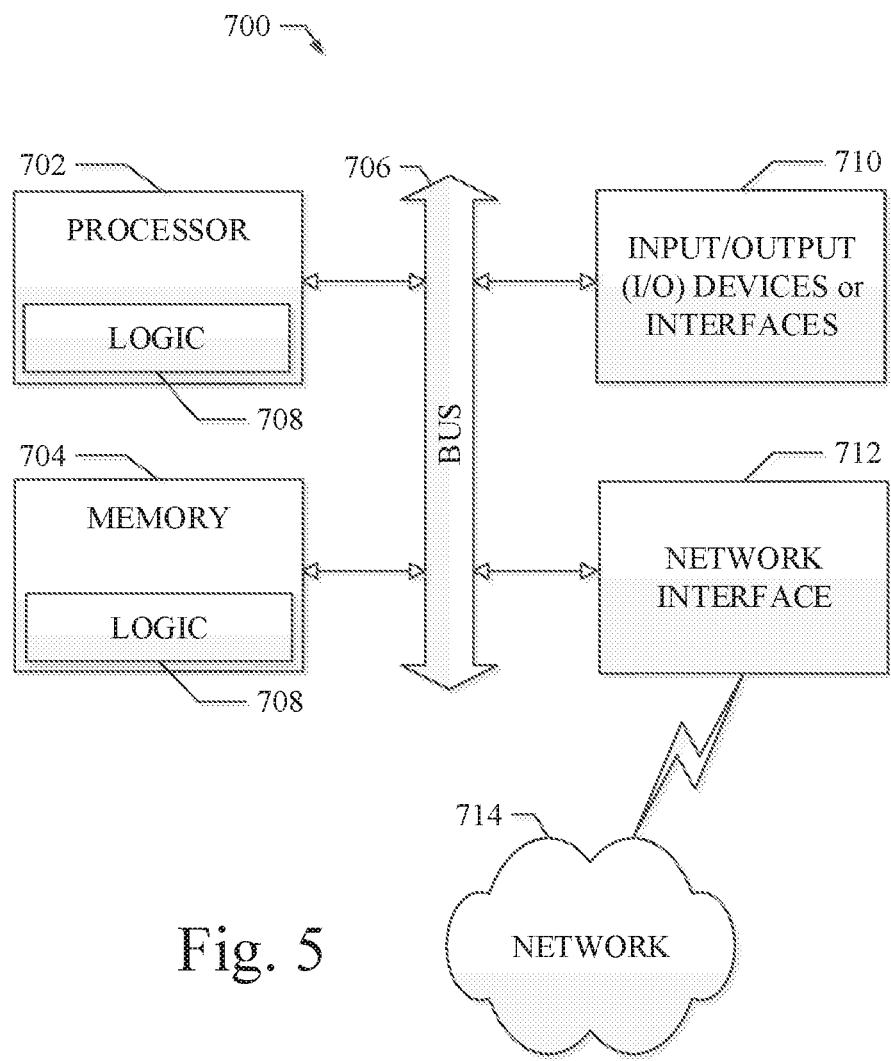
FIG. 5 shows a diagrammatic representation of a machine in the example form of a mobile computing and/or communication system within which a set of instructions when executed and/or processing logic when activated may cause the machine to perform any one or more of the methodologies described and/or claimed herein.

FIG. 5 shows a diagrammatic representation of a machine in the example form of an electronic device, such as a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STA), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip [SoC], general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RIP, WAP, CDMA, TDMA, UMTS, UWB, WEFT, WiMax, Bluetooth™, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

With general reference to notations and nomenclature used herein, the description presented herein may be disclosed in terms of program procedures executed on a computer or a network of computers. These procedural descriptions and representations may be used by those of ordinary skill in the art to convey their work to others of ordinary skill in the art.

A procedure is generally conceived to be a self-consistent sequence of operations performed on electrical, magnetic, or optical signals capable of being stored, transferred, combined, compared, and otherwise manipulated. These signals may be referred to as bits, values, elements, symbols, characters, terms, numbers, or the like. It should be noted, however, that all of these and similar terms are to be associated with the appropriate physical quantities and are merely convenient labels applied to those quantities. Further, the manipulations performed are often referred to in terms such as adding or comparing, which operations may be executed by one or more machines. Useful machines for performing operations of various embodiments may include general-purpose digital computers or similar devices. Various embodiments also relate to apparatus or systems for performing these operations. This apparatus may be specially constructed for a purpose, or it may include a general-purpose computer as selectively activated or reconfigured by a computer program stored in the computer. The procedures presented herein are not inherently related to a particular computer or other apparatus. Various general-purpose machines may be used with programs written in accordance with teachings herein, or it may prove convenient to construct more specialized apparatus to perform methods described herein.

In various embodiments as described herein, example embodiments include at least the following examples.

A system comprising: a main black box data retention device on a transport for recording transport data including operational and status data of the transport while in operation, the main black box data retention device including a wireless data transmission device; and an array of distributed wireless recording devices on the transport and in wireless data communication with the main black box data retention device, each distributed wireless recording device of the array including: a power supply; a wireless data receiver; a non-volatile memory device; and a control unit to receive the transport data from the main black box data retention device via the wireless data receiver and to store the transport data into the non-volatile memory device.

The system as claimed above wherein each distributed wireless recording device of the array further including a temporary memory device and a watchdog timer, the control unit to store the transport data into the temporary memory device, the transport data being transferred to the non-volatile memory device upon timeout of the watchdog timer.

The system as claimed above wherein the transport data including data of a type from the group consisting of: transport performance parameters, operational data, navigational data, global positioning system (GPS) data, environmental data, telemetry data, audio or video recording data, sensor data, and transport identification or registration data.

The system as claimed above wherein the main black box data retention device includes a flight data recorder (FDR) and a cockpit voice recorder (CVR).

The system as claimed above wherein the power supply is of a type from the group consisting of: a battery, a solar cell, a vibration power generator, and a heat converter.

The system as claimed above wherein the control unit is configured to receive the transport data from the main black box data retention device on a periodic basis, the period being a configurable parameter.

The system as claimed above wherein the wireless data receiver is configured to periodically wake up and listen for a data broadcast of the transport data from the main black box data retention device.

The system as claimed above wherein the transport is of a type from the group consisting of: aircraft, trains, ships, trucks, and automobiles.

An apparatus comprising: a distributed wireless recording device on a transport and in wireless data communication with a main black box data retention device, the distributed wireless recording device including: a power supply; a wireless data receiver; a non-volatile memory device; and a control unit to receive transport data from the main black box data retention device via the wireless data receiver and to store the transport data into the non-volatile memory device.

The apparatus as claimed above wherein the distributed wireless recording device further including a temporary memory device and a watchdog timer, the control unit to store the transport data into the temporary memory device, the transport data being transferred to the non-volatile memory device upon timeout of the watchdog timer.

The apparatus as claimed above wherein the transport data including data of a type from the group consisting of: transport performance parameters, operational data, navigational data, global positioning system (GPS) data, environmental data, telemetry data, audio or video recording data, sensor data, and transport identification or registration data.

The apparatus as claimed above wherein the main black box data retention device includes a flight data recorder (FDR) and a cockpit voice recorder (CVR).

The apparatus as claimed above wherein the power supply is of a type from the group consisting of: a battery, a solar cell, a vibration power generator, and a heat converter.

The apparatus as claimed above wherein the control unit is configured to receive the transport data from the main black box data retention device on a periodic basis, the period being a configurable parameter.

The apparatus as claimed above wherein the wireless data receiver is configured to periodically wake up and listen for a data broadcast of the transport data from the main black box data retention device.

The apparatus as claimed above wherein the transport is of a type from the group consisting of: aircraft, trains, ships, trucks, and automobiles.

A method comprising: providing a distributed wireless recording device on a transport and in wireless data communication with a main black box data retention device, the distributed wireless recording device including: a power supply, a wireless data receiver, a temporary memory device, and a non-volatile memory device; receiving transport data from the main black box data retention device via the wireless data receiver on a periodic basis; storing the transport data into the temporary memory device; determining if the distributed wireless recording device has lost data communication with the main black box data retention device; and transferring the transport data from the temporary memory device to the non-volatile memory device if data communication with the main black box data retention device is lost.

The method as claimed above wherein the distributed wireless recording device further including a watchdog timer, the method further including transferring the transport data from the temporary memory device to the non-volatile memory device if the watchdog timer times out.

The method as claimed above wherein the transport data including data of a type from the group consisting of: transport performance parameters, operational data, navigational data, global positioning system (GPS) data, environmental data, telemetry data, audio or video recording data, sensor data, and transport identification or registration data.

The method as claimed above wherein the main black box data retention device includes a flight data recorder (FDR) and a cockpit voice recorder (CVR).

The method as claimed above wherein the power supply is of a type from the group consisting of: a battery, a solar cell, a vibration power generator, and a heat converter.

The method as claimed above wherein the periodic basis being a configurable parameter.

The method as claimed above including periodically waking up the wireless data receiver to listen for a data broadcast of the transport data from the main black box data retention device.

The method as claimed above wherein the transport is of a type from the group consisting of: aircraft, trains, ships, trucks, and automobiles.

A non-transitory machine-useable storage medium embodying instructions which, when executed by a machine, cause the machine to: establish wireless data communication between a distributed wireless recording device and a main black box data retention device on a transport, the distributed wireless recording device including: a power supply, a wireless data receiver, a temporary memory device, and a non-volatile memory device; receive transport data from the main black box data retention device via the wireless data receiver on a periodic basis; store the transport data into the temporary memory device; determine if the distributed wireless recording device has lost data communication with the main black box data retention device; and transfer the transport data from the temporary memory device to the non-volatile memory device if data communication with the main black box data retention device is lost.

The machine-useable storage medium as claimed above wherein the distributed wireless recording device further including a watchdog timer, the instructions being further configured to transfer the transport data from the temporary memory device to the non-volatile memory device if the watchdog timer times out.

The machine-useable storage medium as claimed above wherein the transport data including data of a type from the group consisting of: transport performance parameters, operational data, navigational data, global positioning system (GPS) data, environmental data, telemetry data, audio or video recording data, sensor data, and transport identification or registration data.

The machine-useable storage medium as claimed above wherein the main black box data retention device includes a flight data recorder (FDR) and a cockpit voice recorder (CVR).

The machine-useable storage medium as claimed above wherein the power supply is of a type from the group consisting of: a battery, a solar cell, a vibration power generator, and a heat converter.

The machine-useable storage medium as claimed above wherein the periodic basis being a configurable parameter.

The machine-useable storage medium as claimed above, the instructions being further configured to periodically wake up the wireless data receiver to listen for a data broadcast of the transport data from the main black box data retention device.

The machine-useable storage medium as claimed above wherein the transport is of a type from the group consisting of: aircraft, trains, ships, trucks, and automobiles.

An apparatus comprising: means for establishing wireless data communication between a distributed wireless recording device and a main black box data retention device on a transport, the distributed wireless recording device including: a power supply, a wireless data receiver, a temporary memory device, and a non-volatile memory device; means for receiving transport data from the main black box data retention device via the wireless data receiver on a periodic basis; means for storing the transport data into the temporary memory device; means for determining if the distributed wireless recording device has lost data communication with the main black box data retention device; and means for transferring the transport data from the temporary memory device to the non-volatile memory device if data communication with the main black box data retention device is lost.

The apparatus as claimed above wherein the distributed wireless recording device further including a watchdog timer, the apparatus further including a means for transferring the transport data from the temporary memory device to the non-volatile memory device if the watchdog timer times out.

The apparatus as claimed above wherein the transport data including data of a type from the group consisting of: transport performance parameters, operational data, navigational data, global positioning system (GPS) data, environmental data, telemetry data, audio or video recording data, sensor data, and transport identification or registration data.

The apparatus as claimed above wherein the main black box data retention device includes a flight data recorder (FDR) and a cockpit voice recorder (CVR).

The apparatus as claimed above wherein the power supply is of a type from the group consisting of: a battery, a solar cell, a vibration power generator, and a heat converter.

The apparatus as claimed above wherein the periodic basis being a configurable parameter.

The apparatus as claimed above, the apparatus further including a means for periodically waking up the wireless data receiver to listen for a data broadcast of the transport data from the main black box data retention device.

The apparatus as claimed above wherein the transport is of a type from the group consisting of: aircraft, trains, ships, trucks, and automobiles.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   a main black box data retention device on a transport for recording transport data including operational and status data of the transport while in operation, the main black box data retention device including a wireless data transmission device; and
   an array of distributed wireless recording devices on the transport and in wireless data communication with the main black box data retention device, each distributed wireless recording device of the array including:
   a power supply;
   a wireless data receiver;
   a non-volatile memory device; and
   a control unit to receive the transport data from the main black box data retention device via the wireless data receiver and to store the transport data into the non-volatile memory device.

2. The system of claim 1 wherein each distributed wireless recording device of the array further includes a temporary memory device and a watchdog timer, the control unit to store the transport data into the temporary memory device, the transport data being transferred to the non-volatile memory device upon timeout of the watchdog timer.

3. The system of claim 1 wherein the transport data include data of a type from the group consisting of: transport performance parameters, operational data, navigational data, global positioning system (GPS) data, environmental data, telemetry data, audio or video recording data, sensor data, and transport identification or registration data.

4. The system of claim 1 wherein the power supply is of a type from the group consisting of: a battery, a solar cell, a vibration power generator, and a heat converter.

5. The system of claim 1 wherein the control unit is configured to receive the transport data from the main black box data retention device on a periodic basis, the period being a configurable parameter.

6. The system of claim 1 wherein the wireless data receiver is configured to periodically wake up and listen for a data broadcast of the transport data from the main black box data retention device.

7. The system of claim 1 wherein the transport is of a type from the group consisting of: aircraft, trains, ships, trucks, and automobiles.

8. An apparatus comprising:
a distributed wireless recording device on a transport and in wireless data communication with a main black box data retention device, the distributed wireless recording device including:
a power supply;
a wireless data receiver;
a non-volatile memory device; and
a control unit to receive transport data from the main black box data retention device via the wireless data receiver and to store the transport data into the non-volatile memory device.

9. The apparatus of claim 8 wherein the distributed wireless recording device further includes a temporary memory device and a watchdog timer, the control unit to store the transport data into the temporary memory device, the transport data being transferred to the non-volatile memory device upon timeout of the watchdog timer.

10. The apparatus of claim 8 wherein the transport data include data of a type from the group consisting of: transport performance parameters, operational data, navigational data, global positioning system (GPS) data, environmental data, telemetry data, audio or video recording data, sensor data, and transport identification or registration data.

11. The apparatus of claim 8 wherein the power supply is of a type from the group consisting of: a battery, a solar cell, a vibration power generator, and a heat converter.

12. The apparatus of claim 8 wherein the control unit is configured to receive the transport data from the main black box data retention device on a periodic basis, the period being a configurable parameter.

13. The apparatus of claim 8 wherein the wireless data receiver is configured to periodically wake up and listen for a data broadcast of the transport data from the main black box data retention device.

14. The apparatus of claim 8 wherein the transport is of a type from the group consisting of: aircraft, trains, ships, trucks, and automobiles.

15. A method comprising:
providing a distributed wireless recording device on a transport and in wireless data communication with a main black box data retention device, the distributed wireless recording device including: a power supply, a wireless data receiver, a temporary memory device, and a non-volatile memory device;
receiving transport data from the main black box data retention device via the wireless data receiver on a periodic basis;
storing the transport data into the temporary memory device;
determining if the distributed wireless recording device has lost data communication with the main black box data retention device; and
transferring the transport data from the temporary memory device to the non-volatile memory device if data communication with the main black box data retention device is lost.

16. The method of claim 15 wherein the distributed wireless recording device further includes a watchdog timer, the method further including transferring the transport data from the temporary memory device to the non-volatile memory device if the watchdog timer times out.

17. The method of claim 15 wherein the transport data include data of a type from the group consisting of: transport performance parameters, operational data, navigational data, global positioning system (GPS) data, environmental data, telemetry data, audio or video recording data, sensor data, and transport identification or registration data.

18. The method of claim 15 wherein the power supply is of a type from the group consisting of: a battery, a solar cell, a vibration power generator, and a heat converter.

19. A non-transitory machine-useable storage medium comprising instructions which, when executed by a machine, cause the machine to:
establish wireless data communication between a distributed wireless recording device and a main black box data retention device on a transport, the distributed wireless recording device including: a power supply, a wireless data receiver, a temporary memory device, and a non-volatile memory device;
receive transport data from the main black box data retention device via the wireless data receiver on a periodic basis;
store the transport data into the temporary memory device;
determine if the distributed wireless recording device has lost data communication with the main black box data retention device; and
transfer the transport data from the temporary memory device to the non-volatile memory device if data communication with the main black box data retention device is lost.

20. The machine-useable storage medium of claim 19 wherein the distributed wireless recording device further includes a watchdog timer, the instructions being further configured to cause the machine to transfer the transport data from the temporary memory device to the non-volatile memory device if the watchdog timer times out.

* * * * *